United States Patent [19]
Nakamura et al.

[11] Patent Number: 5,201,062
[45] Date of Patent: Apr. 6, 1993

[54] NOISE REDUCING CIRCUIT

[75] Inventors: Tetsuo Nakamura; Koichi Kasa; Toshihito Ichikawa, all of Saitama, Japan

[73] Assignee: Pioneer Electronic Corporation, Tokyo, Japan

[21] Appl. No.: 675,005

[22] Filed: Mar. 26, 1991

[30] Foreign Application Priority Data

Mar. 28, 1990 [JP] Japan .................................... 2-76738
Mar. 28, 1990 [JP] Japan .................................... 2-76739

[51] Int. Cl.$^5$ ............... H04B 15/00; H04B 11/00; H04H 5/00
[52] U.S. Cl. ..................... 455/67.3; 455/245.1; 455/296; 381/10; 381/94
[58] Field of Search ............. 381/10, 13, 94; 455/63, 455/67.3, 222, 226.2, 226.3, 232.1, 234.1, 234.2, 245.1, 245.2, 247.1, 249.1, 283, 296, 309, 312

[56] References Cited

U.S. PATENT DOCUMENTS

| | | | |
|---|---|---|---|
| 3,851,253 | 11/1974 | Eastmond | 455/222 |
| 4,480,535 | 10/1984 | Kishi | 455/222 |
| 4,628,529 | 12/1986 | Borth et al. | 381/94 |
| 4,703,501 | 10/1987 | Sugai et al. | 455/222 |
| 4,811,404 | 3/1989 | Vilmur et al. | 381/94 |
| 4,817,151 | 3/1989 | Bod et al. | 381/10 |
| 4,833,715 | 5/1989 | Sakai | 381/10 |
| 5,036,543 | 7/1991 | Ueno | 455/222 |
| 5,113,446 | 5/1992 | Kennedy | 381/10 |

FOREIGN PATENT DOCUMENTS 0304923  3/1989  European Pat. Off. .
8912352 12/1989  European Pat. Off. .

Primary Examiner—Reinhard J. Eisenzopf
Assistant Examiner—Lisa Charouel
Attorney, Agent, or Firm—Sughrue, Mion, Zinn, Macpeak & Seas

[57] ABSTRACT

A noise reducing circuit for reducing various noise in the output of a receiver. A noise attenuating circuit receives a demodulated signal and attenuates the noise in the demodulated signal in accordance with a control signal supplied thereto. A signal strength detecting circuit outputs a field intensity signal indicative of a strength of a radio wave signal inputted to the receiver. An output noise level detecting circuit outputs a noise level signal indicative of a noise level in the demodulated signal after the noise is attenuated. A fuzzy inferring circuit performs fuzzy inference in accordance with fuzzy production rules given by membership functions for the field intensity signal and the noise level signal, respectively so as to output an inference output. A control signal generating circuit produces the control signal on the basis of the inference output to control the noise attenuating circuit.

2 Claims, 7 Drawing Sheets

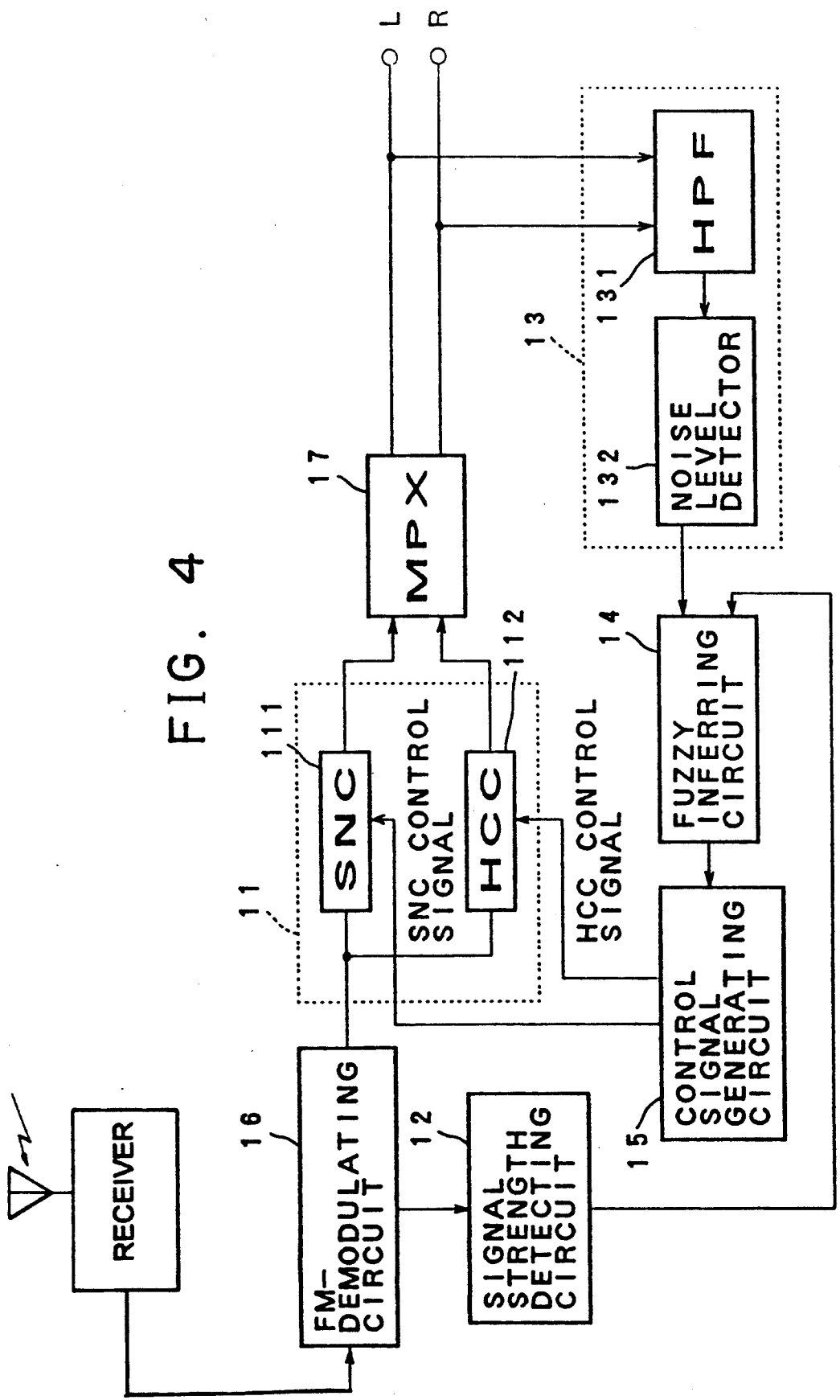

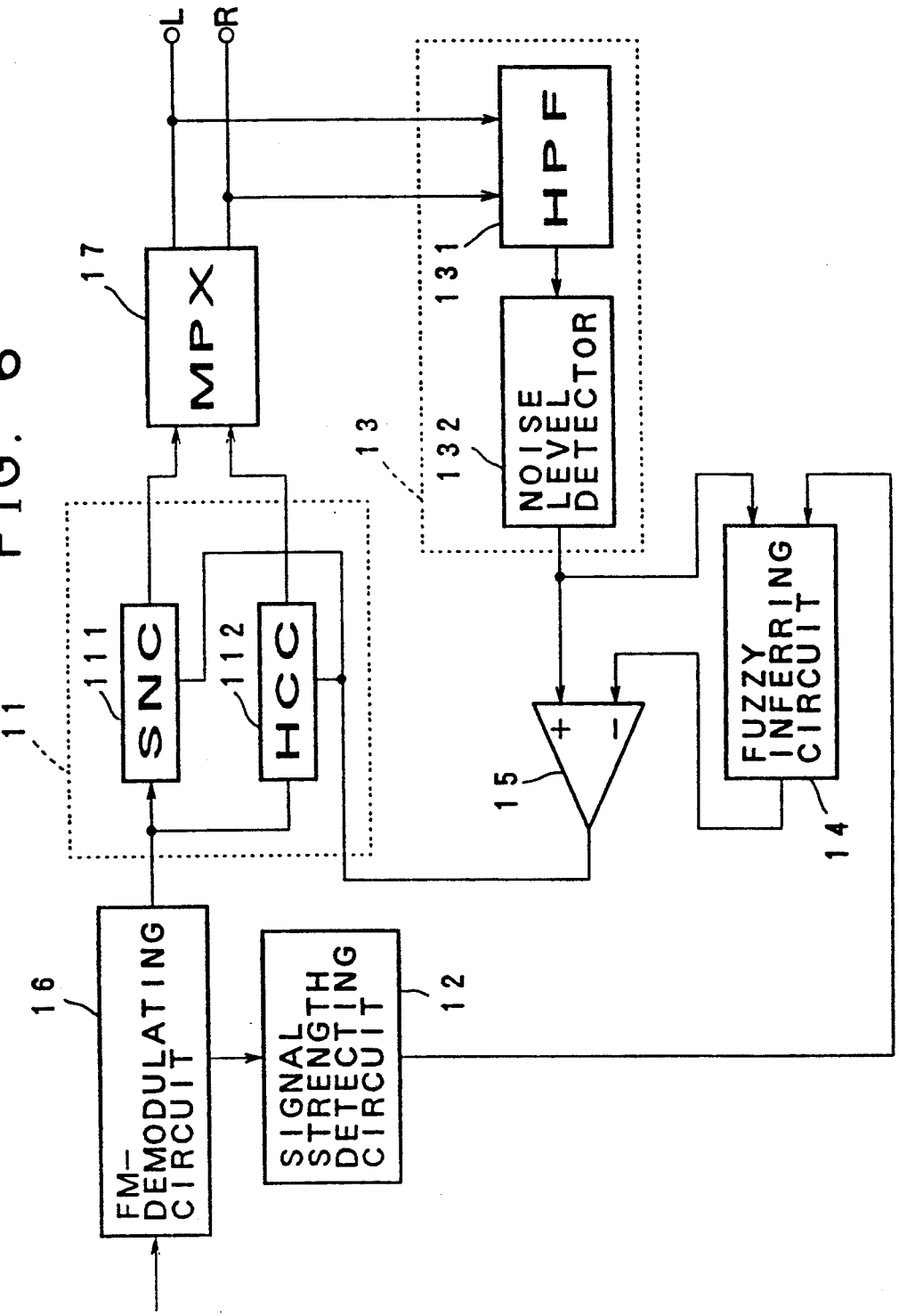

NOISE REDUCING CIRCUIT

BACKGROUND OF THE INVENTION

1. Field of the Invention

The present invention relates to a noise reducing circuit in which various kinds of noises contained in the demodulated output of a radio receiver is reduced by the use of fuzzy control.

2. Prior Art

There have been a variety of circuits for reducing noise in a receiver output. FIG. 1 shows one such noise reducing circuit using a feedback control.

In FIG. 1, a noise reducing circuit 20 includes a noise attenuating circuit 21, a noise level detecting circuit 22, a control signal generating circuit 23.

The noise attenuating circuit 21 takes the form of, for example, a frequency-characteristic controlling circuit, stereo-separation controlling circuit, muting control circuit, or a combination of these. The noise detecting circuit 22 detects a noise level in the output of the noise attenuating circuit 21 to output a noise-level signal. The control signal generating circuit 23 compares the noise-level signal with a fixed reference voltage Vs so as to output a control signal whose magnitude is proportional to the difference between the noise-level signal and the reference voltage Vs. The control signal is fed back to the noise attenuating circuit 21. Thus, the feedback control effectively reduces the noise in the receiver output.

In general, the field intensity of an input to a receiver varies over a wide range. Thus, as shown in FIG. 3B, when the field intensity varies beyond the noise control range of the noise reduction circuit, the noise level in the receiver output rapidly increases. A noise reducing circuit in an FM receiver such as the above-described frequency characteristic controlling circuit, stereo-separation controlling circuit, and muting control circuit has only a narrow range of control, e.g., about 20 dB for the stereo-separation controlling circuit and about several decibels for the frequency characteristic controlling circuit. This does not allow sufficient noise-reducing effect over a wide range of field intensity.

SUMMARY OF THE INVENTION

An object of the present invention is to provide a noise reducing circuit in which the degree of noise reduction effect on the receiver output is controlled over a wide range of field intensity of an input to the receiver by the use of fuzzy control technique.

A noise attenuating circuit receives a demodulated signal and attenuates the noise in the demodulated signal in accordance with a control signal supplied thereto. A signal strength detecting circuit outputs a field intensity signal indicative of the strength of a radio wave signal inputted to the receiver. An output noise level detecting circuit outputs a noise level signal indicative of a noise level in the demodulated signal after the noise is attenuated. A fuzzy inferring circuit performs fuzzy inference in accordance with fuzzy production rules given by membership functions for the field intensity signal E and for the noise level signal N, respectively, so as to output an inference output. A control signal generating circuit produces the control signal on the basis of the inference output to control the noise attenuating circuit.

BRIEF DESCRIPTION OF THE DRAWINGS

Features and other objects of the invention will be more apparent from the description of the preferred embodiments with reference to the accompanying drawings in which:

FIG. 4 is a block diagram showing the construction of a first embodiment of the invention;

FIG. 6 is a block diagram showing the construction of a second embodiment.

DETAILED DESCRIPTION OF THE PREFERRED EMBODIMENTS

Construction

Figure 1:
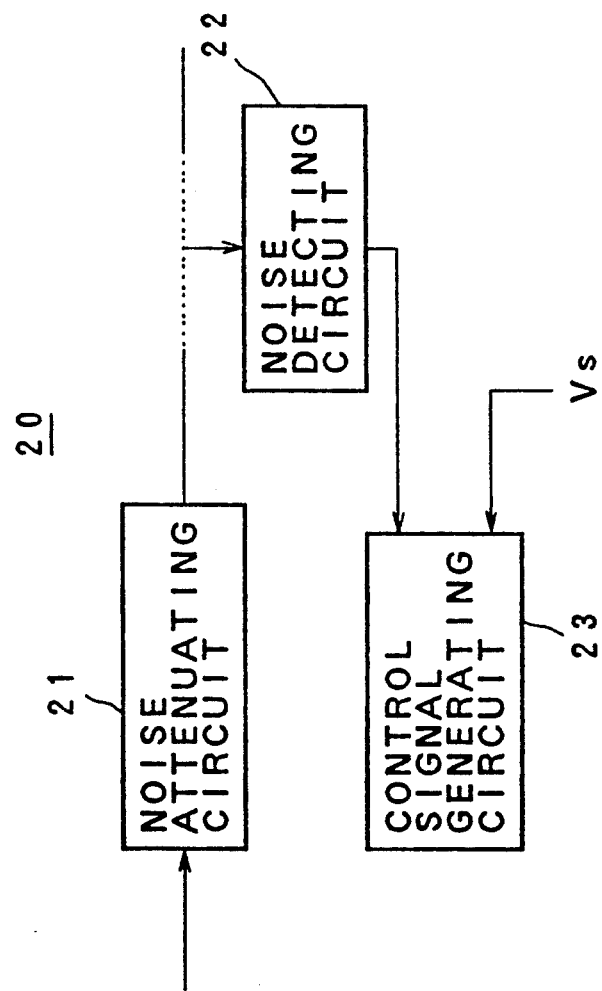
FIG. 1 is a block diagram representing a prior art reducing circuit.

FIG. 4 shows the construction of a first embodiment of the invention. The composite signal of an FM stereo signal demodulated by an FM demodulating circuit 16 is supplied to the noise attenuating circuit 11, which in turn sends the composite signal whose noise is attenuated to an MPX demodulating circuit 17. The noise attenuating circuit 11 consists of two circuits; one is a stereo noise control circuit 111 (referred to as SNC hereinafter) where the level of the sub channel component (L−R) in the composite signal is attenuated in accordance with an SNC control signal supplied thereto, the other is a high-cut control circuit 112 (referred to as HCC hereinafter) where the main channel component (L+R) is reduced a signal level thereof at higher frequencies in accordance with an HCC control signal supplied thereto. The composite signal from the noise attenuating circuit 11 is then separated by the MPX demodulating circuit 17 into the left and right audio signals. A noise level detecting circuit 13 includes a high-pass filter 131 and a noise level detector 132. The high-pass filter 131 passes high frequency component, i.e., noise component over about 20 kHz in the left and right audio signals. The noise level detector 132 rectifies the output of the high-pass filter 131 to produce a noise level signal and supplies it to a fuzzy inferring circuit 14.

The signal strength detecting circuit 12 rectifies the intermediate frequency signal in the FM demodulating circuit 16 to produce a field strength signal indicative of the field intensity E, and supplies it to the fuzzy inferring circuit 14. The fuzzy inferring circuit 14 receives the field intensity signal E and the noise level signal N to perform fuzzy inference processing on the field intensity signal E and the noise level signal N in accordance with fuzzy production rules given by membership functions for these signals E and N, respectively. The fuzzy inference processing will be described later.

The control signal generating circuit 15 receives the output T of the circuit 14 to produce the SNC control signal and HCC control signal and then supplies these control signals to the SNC circuit 111 and the HCC circuit 112, respectively.

Figure 5A:
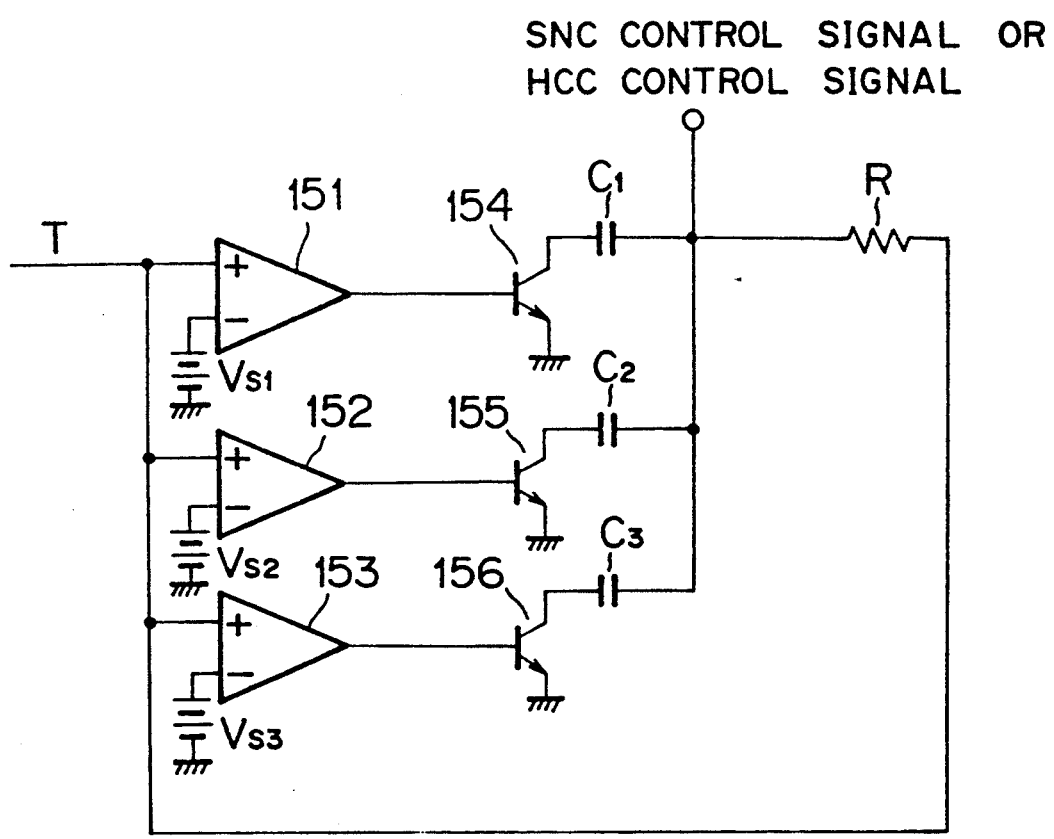
FIGS. 5A-5B are circuit diagram showing a control signal generating circuit of the first embodiment.

Referring to FIG. 5A, the output T of the fuzzy inferring circuit 14 is supplied to comparators 151–153 which compare the output T with reference voltages Vs1 to Vs3 which are in the relationship of $Vs1 < Vs2 < Vs3$. The output T of the fuzzy inferring circuit 14 is also supplied to a resistor R which form various time constants together with capacitors C1–C3. When $Vs2 > T > Vs1$, the transistor 154 turns on forming a time constant RC1. When $Vs3 > T > Vs2$, the transistors 154 and 155 turn on forming a time constant $R(C1+C2)$. When $T > Vs3$, the transistors 154, 155, 156 turn on forming a time constant $R(C1+C2+C3)$. The capacitors C1–C3 are such that they are in the relationship of $RC1 < R(C1+C2) < R(C1+C2+C3)$. Therefore, the output of the control signal generating circuit 15 slowly varies from a previous value of T to a new value of T with one of the time constants RC1, $R(C1+C2)$, and $R(C1+C2+C3)$.

Figure 5B:
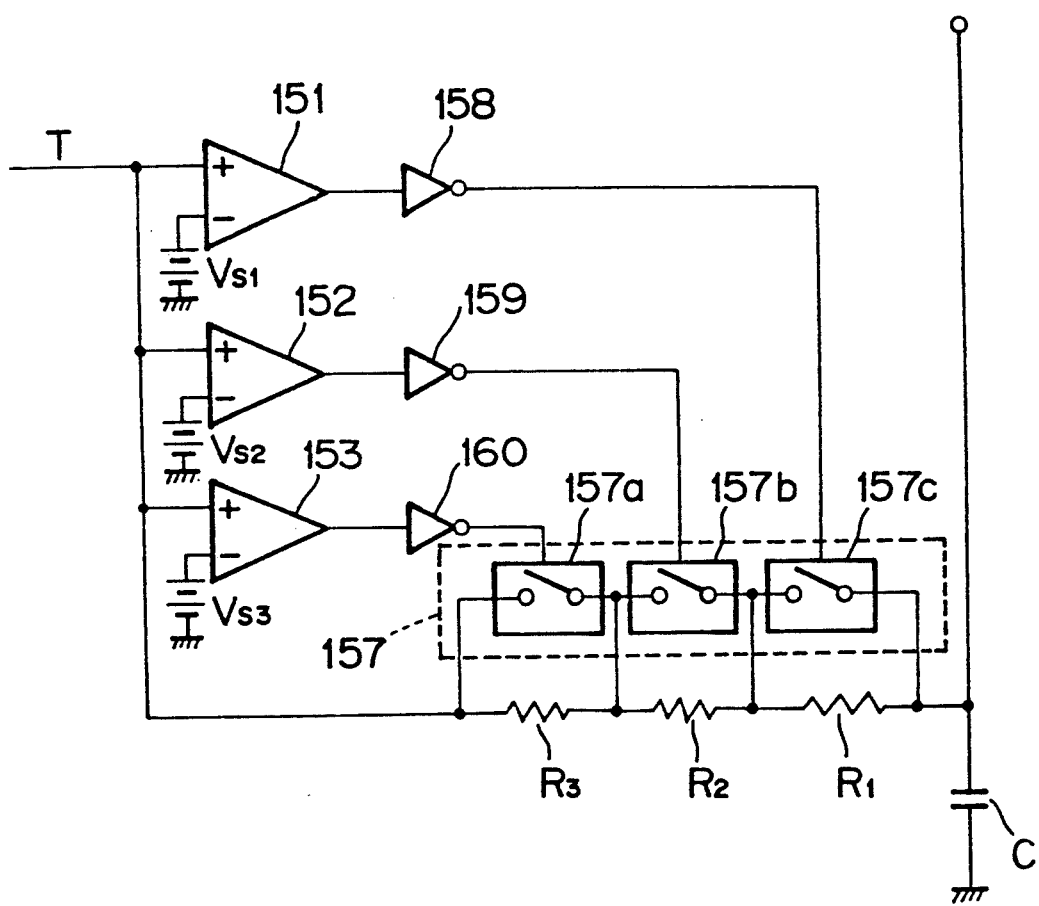

FIG. 5B shows another example of the control signal generating circuit 15 in the form of a subtracter. The output T of the fuzzy inferring circuit 14 is also supplied to a series-circuit of resistors R1, R2, and R3 which form various time constants together with a capacitor C. The outputs of the comparators 151–153 are fed to the control terminals of an analog switch 157 via inverters 158–160. Each of switch elements 157a–157c of the analog switch 157 is connected in parallel with the resistors R1–R3. The analog switch 157 is available from various semiconductor manufactures. When $Vs2 > T > Vs1$, the switch element 157c opens forming a time constant R1C. When $Vs3 > T > Vs2$, the switch element 157c and 157b open forming a time constant $C(R1+R2)$. When $T > Vs3$, the switch element 157a, 157b, 157c open forming a time constant $C(R1+R2+R3)$. The resistors R1–R3 are such that they are in the relation of $Cr1 < C(Ra+R2) < C(R1+R2+R3)$. Therefore, the output of the control signal generating circuit 15 slowly varies from a previous value of T to a new value of T with one of the time constants CR1, $C(R1+R2)$, and $C(R1+R2+R3)$.

Membership Functions

In the present invention, the noise contained in the audio output of the receiver is reduced by a feedback loop using the fuzzy control technique. The fuzzy control technique used in the invention consists of fuzzy production rules R1 and R2, which are given by membership functions (mA1, mA2, mB2) set theoretically or experimentally so that best possible quality of receiver output is achieved in accordance with the field intensity E of an input to the receiver and the noise level N contained in the audio output of the receiver.

The fuzzy production rule R1 is as follows:
Antecedent (IF)
 a1: The field intensity E is high.
 b1: The noise level N is low.
Consequent (THEN)
 The control amount is decreased.
The respective membership functions for the above described fuzzy production rule R1 will be described below.

(1) Membership Function mA1 for Antecedent a1

Figure 2A:
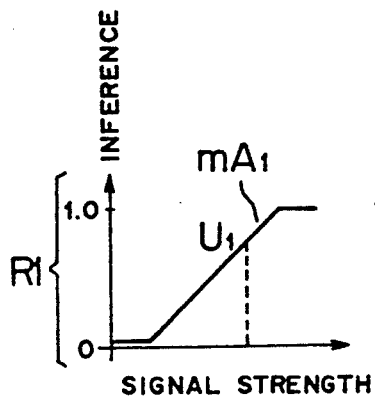
FIGS. 2A-2G are illustrative diagrams illustrating fuzzy inference in the invention.

FIG. 2A shows the plot of the membership function mA1 that gives the idea of how high the field intensity E is. The abscissa represents the field intensity E and the ordinate indicates the grade of inference that matches the antecedent a1. If an actual field intensity E is adequately high so that it can be said that the field intensity is absolutely "high," then the grade of inference is 1. If an actual field intensity E is adequately low so that it can be said that the field intensity is absolutely "low," then the grade of inference is 0. The curve in FIG. 2A indicates that the grade of inference increases as the field intensity E increases.

(2) Membership Function mB1 for Antecedent b1

Figure 2B:
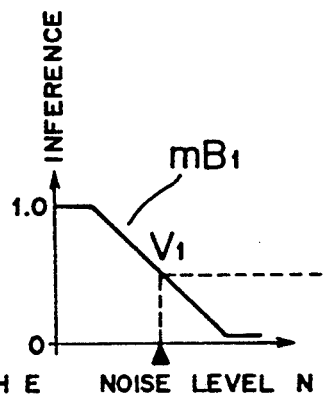

FIG. 2B shows the plot of the membership function mB1 that gives the idea of how low the noise level N is. The abscissa represents the noise level N and the ordinate indicates the grade of inference that matches the antecedent b1. If an actual noise level N is adequately low so that it can be said that the noise level is absolutely "low,+ then the grade of inference is 1. If an actual noise level N is adequately high so that it can be said that the noise level is absolutely "high," then the grade of inference is 0. The curve in FIG. 2B indicates that the grade of inference decreases as the noise level N increases.

(3) Membership Function mP1 that Gives a Conclusion

Figure 2C:
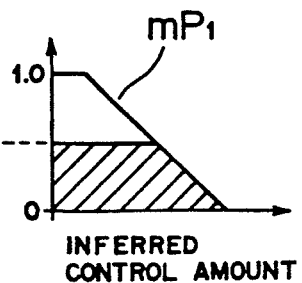

FIG. 2C shows the plot of the membership function mP1 that gives the inference conclusion. The abscissa represents the reference voltage Vr in the fuzzy inferring circuit 14 and the ordinate indicates the grade of inference that matches the consequent of rule R1. If an actual inference conclusion is adequately close to the consequent of rule R1 so that it can be said that the inference conclusion completely coincides with the consequent, then the grade of inference is 1. If an actual inference conclusion is adequately far from the consequent of rule R1, then the grade of inference is 0 The curve in FIG. 2C indicates that the grade of inference conclusion decreases as the reference voltage Vr in the fuzzy inferring circuit 14 decreases.

The fuzzy production rule R2 is as follows:
Antecedent (IF)
 a1: The field intensity E is low.
 b1: The noise level N is high.
Consequent (THEN)
 The control amount is increased.
The respective membership functions for the above fuzzy production rule R2 will be described below.

(1) Membership Function mA2 for Antecedent a2

Figure 2D:
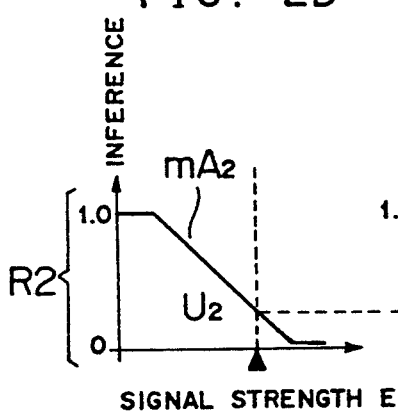

FIG. 2D shows the plot of the membership function mA2 that gives the idea of how low the field intensity E is. The abscissa represents the field intensity E and the ordinate indicates the grade of inference that matches the antecedent a2. If an actual field intensity E is adequately low so that it can be said that the field intensity E is absolutely "low," then the grade of inference is 1. If an actual field intensity E is adequately high so that it can be said that the field intensity is absolutely "high," then the grade of inference is 0. The curve in FIG. 2D indicates that the grade of inference decreases as the field intensity E increases.

(2) Membership Function mB2 for Antecedent b2

Figure 2E:
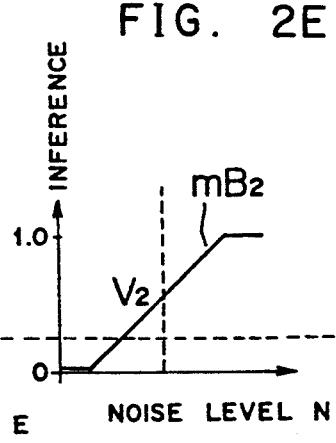

FIG. 2E shows the plot of the membership function mB2 that gives the idea of how high the noise level N is. The abscissa represents the noise level N and the ordinate indicates the grade of inference that matches the antecedent b2. If an actual noise level N is adequately high so that it can be said that the noise level is absolutely "high," then the grade of inference is 1. If an actual noise level N is adequately low so that it can be said that the noise level is absolutely "low," then the grade of inference is 0. The curve in FIG. 2E indicates that the grade of inference increases as the noise level N increases.

(3) Membership Function mP2 that Gives a Conclusion

Figure 2F:
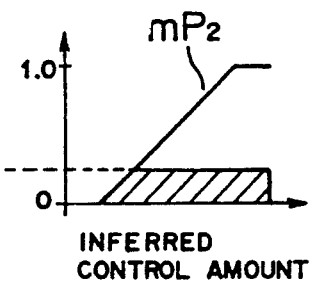

FIG. 2F shows the plot of the membership function mP2 that gives the inference conclusion. The abscissa represents the reference voltage Vr in the fuzzy inferring circuit 14 and the ordinate indicates the grade of inference that matches the consequent of rule R2. If an actual inference conclusion is adequately close to the consequent of rule R2 so that it can be said that the inference conclusion completely coincides with the consequent, then the grade of inference is 1. If an actual inference conclusion is adequately far from the consequent of rule R2 so that it can be said that the inference conclusion is absolutely far from the consequent of rule R2, then the grade of inference is 0. The curve in FIG. 2F indicates that the grade of inference conclusion increases as the reference voltage Vr in the fuzzy inferring circuit 14 increases.

The stability of the noise reducing circuit of the invention using fuzzy control will now be described.

Generally speaking, a feedback loop should be of a negative feedback in order that the feedback loop is stable at all times. If the loop becomes a positive feedback loop, then the loop becomes unstable. The respective elements (11-13, 15-17) of the present invention in FIG. 4 have a linear input-to-output relationship and are known to be stable at any conditions. Thus, the stability of the fuzzy inferring circuit 14 determines the stability of the entire loop.

For the fuzzy production rule R1, we have the following relationships.

$$C = f(E, N)$$

where C is an amount of control, E is the field intensity of the signal to the receiver, N is the noise level, and f is a function.

Differentiating C with respect to E and with respect to N, respectively, we have $$dC/dE < 0$$
$$dC/dN > 0 \quad (1)$$

Likewise, for the fuzzy production rule R2, we have the following relation.

Differentiating C with respect to E and with respect to N, respectively, we have $$dC/dE < 0$$
$$dC/dN > 0 \quad (2)$$

The equations (1) and (2) hold at all times and therefore the entire feedback loop is stable at all times.

Operation

The fuzzy inference processing of the present invention is carried out as follows:

(1) The values U1 and U2 of the membership functions mA1 and mA2 are determined for a given field intensity E as shown in FIGS. 2A and 2D, respectively.

(2) The values V1 and V2 of the membership functions mB1 and mB2 are determined for a given noise level N as shown in FIGS. 2B and 2E, respectively.

(3) The inference processing is performed in accordance with the fuzzy production rule R1. There are various ways of finding which one of the values of the membership functions mA1 and mB1 is best fitted to the fuzzy production rule R1, including center-of-gravity method, MAX or MIN value methods. In the present invention, the MIN value method is used where the smallest value is selected. Referring to FIGS. 2A and 2B, V1 is smaller than U1, and therefore V1 is selected. Thus, the inferred control amount determined by the membership mP1 is given by the shaded area in FIG. 2C according to the truncation method of Yager.

(4) Another inference processing is performed in accordance with the fuzzy production rule R2. Through the use of the MIN value method, U2 is selected since U2 is smaller than V2. Thus, the inferred control amount determined by the membership function mP2 is given by the shaded area in FIG. 2F according to the truncation method of Yager.

Figure 2G:
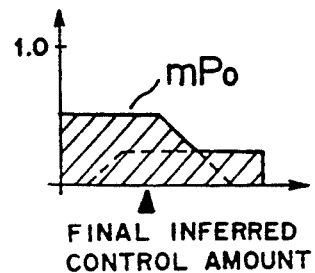

(5) There are various ways of finding a final inferred control amount. In the present invention, the circuit 14 determines a final inference conclusion on the basis of the inference conclusions in the above described (3) and (4) by the use of center-of-gravity method where the shaded area of FIG. 2C is placed over that of FIG. 2F by the MAX synthesizing technique so as to synthesize the membership function mPO as shown in FIG. 2G. The value on the abscissa that gives the center-of-gravity of the membership function mPO is outputted as the final inferred control amount.

The control signal generating circuit 15 provides the SNC control signal as well as HCC control signal on the basis of the final inference conclusion. The control signal generating circuit 15 may be designed such that it provides various control signals based on the fuzzy inference. For example, the control signal may be outputted when it exceeds a predetermined threshold level above which the noise attenuating circuit is under fuzzy control, or may be outputted with a time constant during which the noise attenuating circuit shifts from one operating point to another as in the first embodiment.

Thus, the control signal decreases in magnitude with increasing field intensity E or decreasing noise level N, while the noise attenuating circuit 11 carries out the noise-attenuating operation designed for lower noise levels N. Conversely, the control signal increases in magnitude with decreasing field intensity E or increasing noise level N, and the noise attenuating circuit 11 carries out the noise-attenuating operation designed for higher noise levels N.

Effects

Figure 3A:
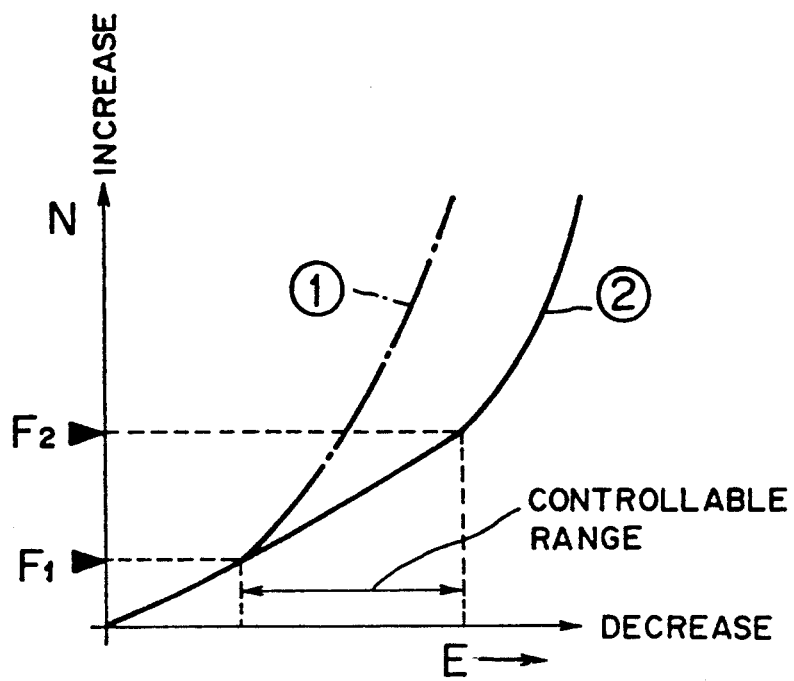
FIG. 3A is an illustrative diagram illustrating noise reduction characteristic with fuzzy control according to the present invention.
Figure 3B:
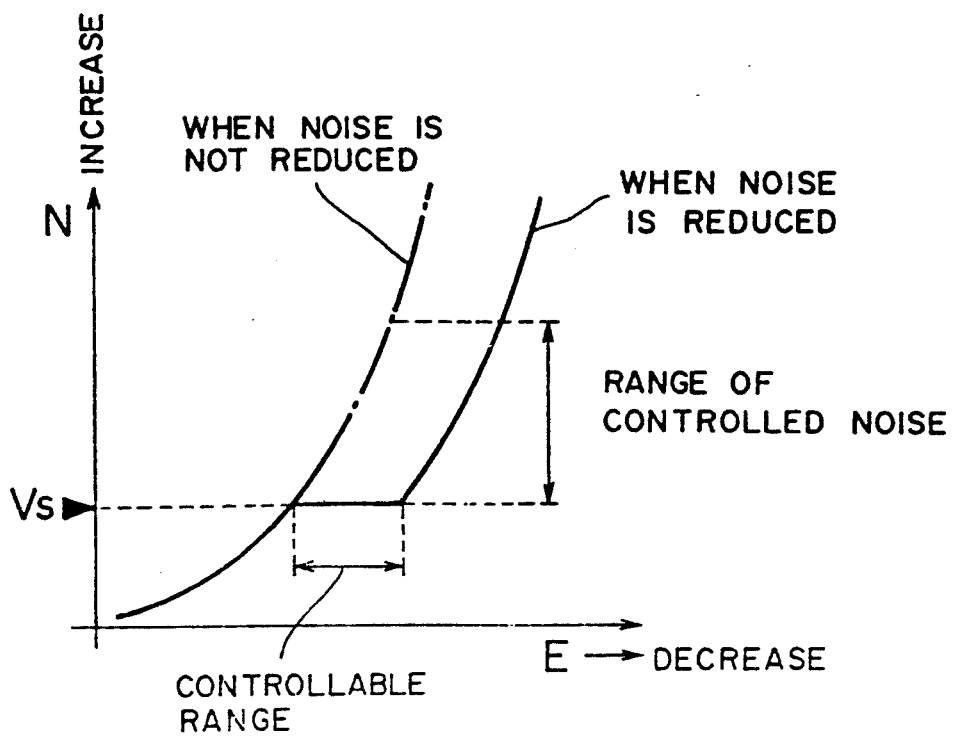
FIG. 3B is an illustrative diagram illustrating noise reduction characteristic of a prior art noise reducing circuit.

FIG. 3A shows the noise characteristics of an noise reducing circuit using a feedback loop with fuzzy control therein. FIG. 3B shows the noise characteristics of a prior art noise reducing circuit in FIG. 1.

In FIG. 3A, the abscissa represents the field intensity E and the ordinate the noise level N. Curve 1 shows a noise characteristic without fuzzy control and curve 2 with fuzzy control. As the receiving condition becomes worse, the final inference conclusion shifts from F1 to F2. Thus, as compared to the prior art noise reducing circuit, the noise characteristic has a slower change exhibiting noise reducing effect over a wider range of field intensity of the signal to the receiver.

In the present invention, noise reduction is effected by attenuating or processing part of the demodulated output resulting in a loss in fidelity to some extent. For example, the SNC circuit 111 in FIG. 4 attenuates the level of sub channel component of the stereo composite signal in accordance with the SNC control signal supplied thereto so as to reduce noise level. However, attenuating the sub channel component causes the stereo separation characteristic to be deteriorated. Therefore, noise reduction effect and the overall signal quality of the receiver output are two opposing factors. In the present invention, the degree of attenuating or processing part of the demodulated signal is varied in accordance with the noise level N and the field intensity E so that the noise in the receiver output is reduced with a minimum loss of fidelity.

Second embodiment

FIG. 6 shows a second embodiment of the invention. The control signal generating circuit 15 produces an SNC/HCC control signal on the basis of the noise level N and the output of the fuzzy inferring circuit 14 so as to control the SNC circuit 111 and the HCC circuit 112. In this embodiment, the threshold level of control operation of the SNC 111 is set lower than that of the HCC circuit 112. Thus, when the field intensity E decreases i.e., the SNC/HCC control signal increases, the SNC circuit starts to operate first, then the HCC circuit at a predetermined higher level of the SNC/HCC control signal.

The higher the SNC/HCC control signal becomes, the more the SNC circuit attenuates the sub channel signal of the composite signal. Thus, The lower the field intensity E becomes, the lower the stereo separation between the L channel and R channel becomes. This causes the noise level contained in the L and R channel audio signals to decrease at the expense of deteriorated stereo separation.

When the SNC/HCC control signal exceeds the predetermined level, the HCC circuit 112 now starts to operate so as to take out the main signal (L+R) in the composite signal to reduce the signal level at higher frequencies of the main signal. That is, the lower the field intensity E becomes, the more the HCC circuit 112 attenuates the signal level at higher frequencies of the main signal. This causes the noise level contained in the L and R channel audio signals to decrease.

While the second embodiment has been described with respect to a case where the control signal generating circuit 15 produces the SNC/HCC control signal on the basis of the output of the fuzzy inferring circuit 14 and the noise-level signal N, the circuit can also be arranged such that the control signal generating circuit 15 is supplied with the field intensity signal E instead of the noise-level signal N.

What is claimed is:

1. A noise reducing circuit for reducing various noises in an output of a receiver, comprising:
    a noise attenuating circuit for attenuating in accordance with a control signal supplied thereto the noise in a demodulated signal supplied to said noise attenuating circuit, said noise attenuating circuit outputting the demodulated signal after the noise is attenuated;
    a signal strength detecting circuit for outputting a field intensity signal indicative of a strength of a radio wave signal inputted to the receiver;
    an output noise level detecting circuit for outputting a noise level signal indicative of a noise level in the demodulated signal after the noise is attenuated;
    a fuzzy inferring circuit for performing fuzzy inference in accordance with fuzzy production rules given by membership functions for said field intensity signal and said noise level signal, respectively so as to output an inference output; and
    a control signal generating circuit for producing said control signal on the basis of the inference output to control said noise attenuating circuit.

2. A noise reducing circuit according to claim 1, wherein said control signal generating circuit produces said control signal on the basis of the inference output and said noise level signal.

* * * * *